Sept. 7, 1937.  C. R. CARPENTER  2,092,638
FISH STRINGER
Filed Nov. 4, 1933
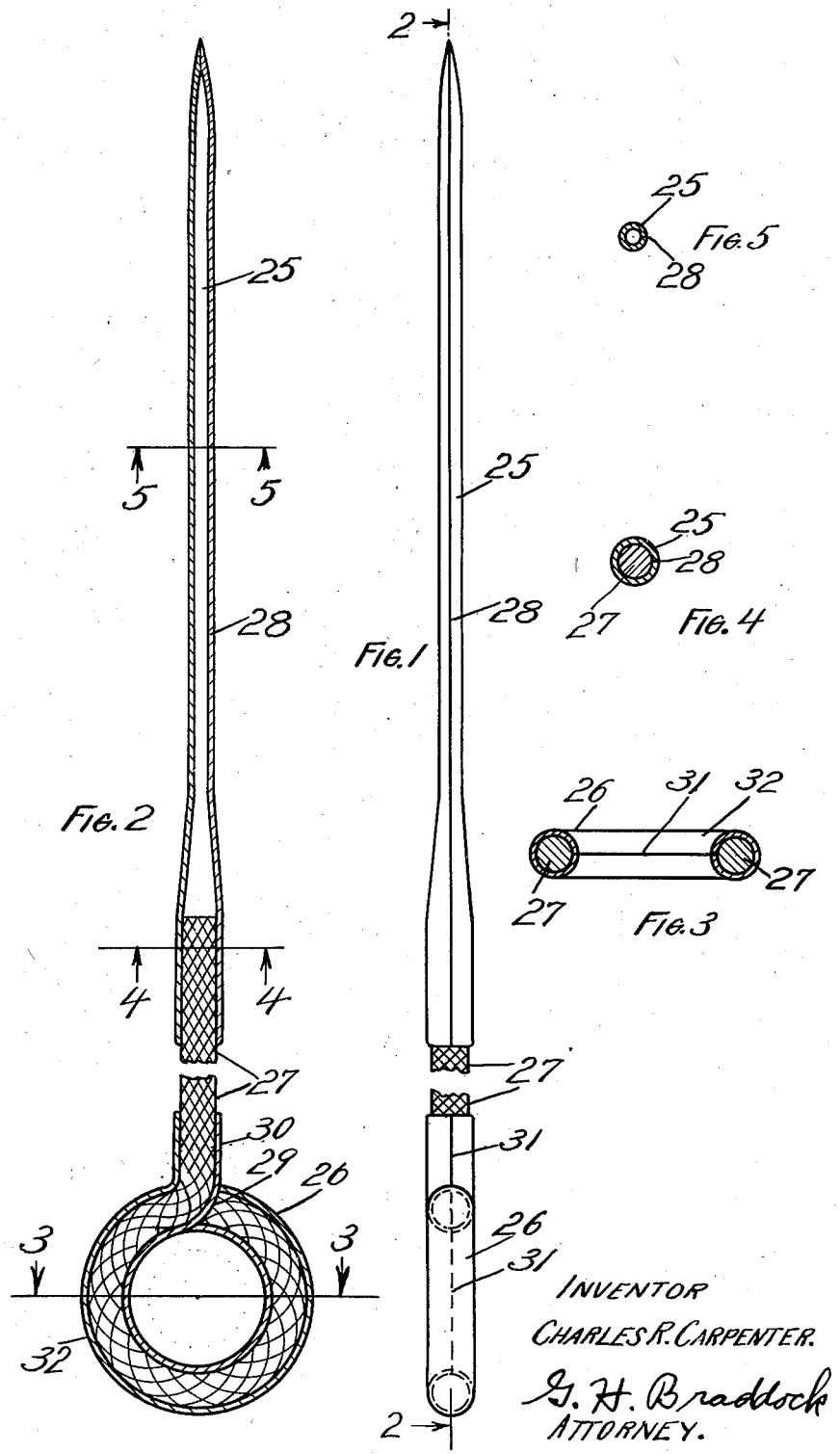

Patented Sept. 7, 1937

2,092,638

UNITED STATES PATENT OFFICE 2,092,638

FISH STRINGER

Charles R. Carpenter, Robbinsdale, Minn.

Application November 4, 1933, Serial No. 696,715

1 Claim. (Cl. 224—7)

This invention relates to a fish stringer.

An object of the invention is to provide a fish stringer which will include a needle of novel and improved construction.

A further object is to provide a fish stringer which will include a ring of novel and improved construction.

A further object is to provide a fish stringer which will consist of a needle, a ring, and a fish stringing cord or chain between said needle and ring, both or either of which needle and/or ring will be secured to the cord or chain in novel and improved manner.

A further object is to provide a fish stringer including a fish stringing cord or chain with fish stringing needle, and wherein there will be a permanent and novel and improved integral assembly or connection between said cord or chain and said needle.

A further object is to provide a fish stringer including a fish retaining cord or chain with fish retaining ring, and wherein there will be a permanent and novel and improved integral assembly or connection between said cord or chain and said ring.

With the above objects in view, as well as others which will appear as the specification proceeds, the invention comprises the construction, arrangement and combination of parts, as now to be fully described and as hereinafter to be specifically claimed, it being understood that the disclosure herein is merely illustrative and intended in no way in a limiting sense, changes in details of construction and arrangement of parts, being permissible so long as within the spirit of the invention and the scope of the claim which follows.

In the accompanying drawing forming a part of this specification,

Fig. 1 is an elevational view, partially broken away, of a fish stringer made according to the invention;

Fig. 2 is a longitudinal sectional view, taken on line 2—2 in Fig. 1;

Fig. 3 is a detail sectional view, taken as on line 3—3 in Fig. 2;

Fig. 4 is a detail sectional view, taken as on line 4—4 in Fig. 2; and

Fig. 5 is a detail sectional view, taken as on line 5—5 in Fig. 2.

Speaking generally, the novel and improved fish stringer consists of a needle 25, a ring 26, and a fish stringing and retaining cord, cable, or chain 27 to the opposite end portions of which said needle and ring are securely united.

As shown, the element 27 may be more definitely described when referred to as a cord or cable, but a chain, even in its stricter sense and consisting of connected chain links, can be employed as a full equivalent of said element 27 to the production of a highly satisfactory fish stringer. Hence, it is to be understood that hereinafter, and particularly in the appended claim, the use of the word "cord" is in the broad sense and intended to mean any suitable fish stringing and retaining entity constituting a fish receiving means between a fish stringing needle and a fish retaining ring.

In the practical use of the fish stringer, when a first fish caught is to be strung, the needle 25 is run through the mouth or other part of the fish and the cord is usually threaded through the fish until the ring 26 is adjacent the fish. Then the needle with cord is ordinarily threaded through the ring, and a portion of the cord at the needle end thereof is attached to the boat so that the strung fish will preferably be suspended from the boat and beneath the water level of the lake or stream. As additional fish are caught, the cord is released from the boat, and the newly caught fish are threaded upon the needle and cord and pushed down toward the ring so as to be within the water when the cord is again attached to the boat. The sizes of the needle and ring and the overall length of the fish stringer are not of the essence of the invention and may be varied at will. The sizes of needle and ring and diameter of cord as disclosed in the drawing, and larger and smaller sizes of needle and ring and diameter of cord, are satisfactory, as is also a fish stringer having overall length of three to six feet, and even greater or less length, when in a straight line.

The needle 25 is made by the simultaneous performance of preliminary needle forming operations and cord and needle uniting operations, as well as by the performance of finishing operations upon the needle after the simultaneous preliminary needle forming and cord-and-needle-uniting operations are completed.

Each needle consists of a piece or plate of metal, desirably severed from a continuous strip of metal, of proper length, and each piece or plate of metal is first preliminarily shaped to curved form and then further shaped and fitted to tubular form about an end portion of the cord 27 in such manner that said needle is attached to said cord.

A cord, such as 27, for a fish stringer is suitably associated with one end portion of a piece or plate of metal which is to become a needle, to extent about as disclosed in Fig. 2, and said piece or plate of metal is wrapped or curled snugly about the cord to become attached thereto. The cord is of diameter, or cross-sectional area, sufficiently great to be tightly grasped by, compressed in, and united with the tube into which the piece or plate of metal is made when said metal is curled or formed about said cord. The metal of the piece or plate is wrapped or curled about the cord so that the meeting side edges 28 of the piece or plate of metal extend longitudinally of the finshed needle and along the portion of the cord grippingly engaged by the needle.

After the needle 25 is shaped to tubular form and united with the cord 27, it is swaged, pointed and finished. Desirably, the whole length of the needle, including the end portion thereof having the cord, is subjected to a swaging operation. The swaging is designed to further compress the attached end portion of the tubular needle and cause the needle and cord to be more firmly united or connected than when the assembly of the needle and the cord was completed prior to the swaging operation. Of course, the surface of the completely formed and attached needle can be polished, lacquered, electroplated, and/or the like, in any instances when this is considered desirable.

It will be seen that the needle 25 consists of a hollow tube of plate metal having the side edges of the plate metal in proximity to each other along a side of the hollow tube, and that one end portion of the hollow tube and plate metal merges in a point for the needle and the other end portion of said hollow tube and plate metal is fitted about an end portion of the cord in encompassing and gripping relation to said cord. The meeting side edges of the plate metal extend along the portion of the cord grippingly engaged by the hollow tube.

The ring 26 is made by the simultaneous performance of preliminary ring forming operations and cord and ring uniting operations, as well as by the performance of finishing operations upon the ring after the simultaneous preliminary ring forming and cord-and-ring-uniting operations are completed.

Each ring consists of a piece or plate of metal, desirably severed from a continuous strip of metal, of proper length, and each piece or plate of metal for providing a ring 26 is first preliminarily formed or shaped about and thus attached to a fish stringer cord such as 27. After the ring is shaped to tubular form and united with the cord, it is bent or curled to annular form, with the free end portion 29 of the ring fitted or arranged down against a shank 30 thereof, the bending or curling of the ring constituting the finishing operations thereof. It will be seen that the plate metal of the ring 26 has its side edges 31 arranged in proximity to each other along a side of the cord 27.

The completely formed and attached ring can of course be polished, lacquered, electroplated, and/or the like.

Stated in other language, the ring 26 consists of a tubular element of plate metal grippingly surrounding throughout its length a circumference of the end portion of the cord 27 to which it is united, the meeting side edges 31 of the plate metal extending along a side of the tubular element in proximity to each other and to the cord. The tubular element includes the shank 30 of the ring member at the inner end thereof upon the cord and a loop portion 32 of said tubular element adjacent to the shank 30 upon an end portion of said cord.

What I claim is:

In a fish stringer, a fish stringing and retaining cord, a fish stringing needle united with said cord, and a fish retaining member united with said cord, said retaining member consisting of a tubular element of plate metal grippingly surrounding an end portion of said cord, there being meeting side edges of said plate metal extending along a side of said tubular element in proximity to said cord, said tubular element including a shank of said retaining member at the inner end thereof encompassing but a single circumference of said cord and a loop portion of the retaining member at the outer end of the shank encompassing but a single circumference of an end portion of the cord at the outer end of the end portion of said cord encompassed by said shank.

CHARLES R. CARPENTER.